(12) United States Patent
Agapiou et al.

(10) Patent No.: US 7,244,795 B2
(45) Date of Patent: Jul. 17, 2007

(54) POLYMERIZATION PROCESS USING METALLOCENE CATALYST SYSTEMS

(75) Inventors: Agapios Kyriacos Agapiou, Humble, TX (US); David Michael Glowczwski, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 28 days.

(21) Appl. No.: 10/730,525

(22) Filed: Dec. 8, 2003

(65) Prior Publication Data

US 2005/0124487 A1   Jun. 9, 2005

(51) Int. Cl.
*C08F 4/44* (2006.01)
*C08F 4/72* (2006.01)

(52) U.S. Cl. .................... 526/160; 526/165; 526/170; 526/943

(58) Field of Classification Search ............... 526/160, 526/165, 170, 943
See application file for complete search history.

(56) References Cited

U.S. PATENT DOCUMENTS

| | | | |
|---|---|---|---|
| 3,248,179 A | 4/1966 | Norwood | 23/285 |
| 4,271,060 A | 6/1981 | Hubby | 260/33.6 A |
| 4,613,484 A | 9/1986 | Ayres et al. | 422/132 |
| 5,001,205 A | 3/1991 | Hoel | 526/128 |
| 5,026,798 A | 6/1991 | Canich | 526/127 |
| 5,236,998 A | 8/1993 | Lundeen et al. | 525/52 |
| 5,283,278 A | 2/1994 | Daire et al. | 524/399 |
| 5,589,555 A | 12/1996 | Zboril et al. | 526/64 |
| 5,595,950 A | 1/1997 | Sagar et al. | 502/104 |
| 5,665,818 A | 9/1997 | Tilston et al. | 525/53 |
| 5,677,375 A | 10/1997 | Rifi et al. | 525/53 |
| 5,703,187 A | 12/1997 | Timmers | 526/282 |
| 5,747,406 A | 5/1998 | Reichle et al. | 502/117 |
| 5,763,547 A | 6/1998 | Kolthammer et al. | 526/129 |
| 6,015,766 A | 1/2000 | Kissin | 502/103 |
| 6,048,817 A | 4/2000 | Sagae et al. | 502/117 |

(Continued)

FOREIGN PATENT DOCUMENTS

EP   0 511 665 A2   11/1992

(Continued)

OTHER PUBLICATIONS

W. Kaminsky, et al., "Fluorinated Half-Sandwich Complexes as Catalysts in Syndiospecific Styrene Polymerization," Macromolecules, American Chemical Society, vol. 30, No. 25, pp. 7648-7650, Dec. 15, 1997.

(Continued)

*Primary Examiner*—J. A. Lorengo
*Assistant Examiner*—J. Pasterczyk
(74) *Attorney, Agent, or Firm*—Kevin M. Faulkner; Leandro Arechederra

(57) ABSTRACT

The present invention relates to a polymerization process using improved metallocene catalyst systems. Specifically, the catalyst systems of the present invention relate to a metallocene compound having optimized metals loading and activator concentration, and demonstrate improved operability and productivity. In an exemplary embodiment, the improved metallocene catalyst system of the present invention comprises a metallocene catalyst compound activated by methylaluminoxane, and a support material, the methylaluminoxane being present in the range of from 3 to 9 mmole methylaluminoxane per gram of support material, and the metallocene being present in the range of from 0.01 to 1.0 mmole metallocene per gram of support material.

22 Claims, 2 Drawing Sheets

U.S. PATENT DOCUMENTS

| | | | |
|---|---|---|---|
| 6,069,213 A | 5/2000 | Nemzek et al. | 526/113 |
| 6,090,740 A | 7/2000 | Agapiou et al. | 502/104 |
| 6,107,230 A | 8/2000 | McDaniel et al. | 502/104 |
| 6,153,551 A | 8/2000 | McDaniel et al. | 502/110 |
| 6,165,929 A | 12/2000 | McDaniel et al. | 502/117 |
| 6,180,731 B1 | 1/2001 | Rohde et al. | 526/113 |
| 6,245,705 B1 | 6/2001 | Kissin | 502/117 |
| 6,265,339 B1 | 7/2001 | Bidell et al. | 502/104 |
| 6,300,271 B1 | 10/2001 | McDaniel et al. | 502/104 |
| 6,300,436 B1 | 10/2001 | Agapiou et al. | 526/154 |
| 6,355,594 B1 | 3/2002 | McDaniel et al. | 502/152 |
| 6,395,666 B1 | 5/2002 | McDaniel et al. | 502/87 |
| 6,423,663 B2 | 7/2002 | Debras | 502/208 |
| 6,444,763 B1 | 9/2002 | Sagae et al. | 526/126 |
| 6,482,901 B1 | 11/2002 | Debras | 526/113 |
| 6,486,089 B1 | 11/2002 | Kissin et al. | 502/104 |
| 6,489,428 B1 | 12/2002 | Debras et al. | 526/352 |
| 6,521,728 B1 | 2/2003 | Diefenbach | 526/165 |
| 6,531,550 B1 | 3/2003 | McDaniel et al. | 526/97 |
| 6,548,441 B1 | 4/2003 | McDaniel et al. | 502/84 |
| 6,548,442 B1 | 4/2003 | Collins et al. | 502/113 |
| 6,583,240 B2 | 6/2003 | Wang et al. | 526/153 |
| 6,608,153 B2 | 8/2003 | Agapiou et al. | 526/154 |
| 2002/0007023 A1 | 1/2002 | McDaniel et al. | 526/64 |
| 2002/0032287 A1 | 3/2002 | McCullough | 526/68 |
| 2002/0082365 A1 | 6/2002 | McDaniel et al. | 526/64 |
| 2002/0128404 A1 | 9/2002 | McDaniel et al. | 526/127 |
| 2003/0120002 A1 | 6/2003 | McDaniel et al. | 526/97 |

FOREIGN PATENT DOCUMENTS

| | | |
|---|---|---|
| EP | 0 767 184 A1 | 4/1997 |
| EP | 0 794 200 A2 | 9/1997 |

OTHER PUBLICATIONS

Axel Herzog, et al., "Reactions of $(\eta^5$-$C_5Me_5)ZrF_3$, $(\eta^5$-$C_5Me_4Et)ZrF_3$, $(\eta^5$-$C_5Me_5)_2ZrF_2$, $(\eta^5$-$C_5Me_5)HfF_3$ and $(\eta^5$-$C_5Me_5)TaF_3$ with $AlMe_3$. Structure of the First Hafnium-Aluminum-Carbon Cluster," Organometallics, vol. 15, No. 3, pp. 909-917, Jul. 31, 1995.

Eamonn F. Murphy, et al., "Synhesis and Spectroscopic Characterization of a Series of Substituted Cyclopentadienyl Group 4 Fluorides; Crystal Structure of the Acetylacetonato Complex $[(ACAC)_2(\eta^5$-$C_5Me_5)Zr(\mu$-$F)SnMe_3Cl]$," Dalton, Paper 5/07747H, Nov. 28, 1995.

F. Garbassi, et al., "XPS Study of Metallocene Based Catalysts for the Polymerization of Ethylene," Journal of Molecular Catalysts A: Chemical 101 (1995) 190-209, Mar. 1995.

Walter Kaminsky, "Highly Active Metallocene Catalysts for Olefin Polymerization," J. Chem. Soc., Dalton Trans., pp. 1413-1418, 1998.

Eamonn F. Murphy, et al., "Organometallic Fluorides: Compounds Containing Carbon-Metal-Fluorine Fragments of D-Block Metals," American Chemical Society, Chem. Rev. 1997, 97, pp. 3425-3468, Jun. 4, 1997, Revised Sep. 15, 1997.

POLYMERIZATION PROCESS USING METALLOCENE CATALYST SYSTEMS

FIELD OF THE INVENTION

The present invention relates to a polymerization process using improved metallocene catalyst systems. Specifically, the catalyst systems of the present invention relate to a metallocene catalyst compound having optimized metals loading and activator concentration, and demonstrate improved operability and productivity.

BACKGROUND OF THE INVENTION

Advances in polymerization and catalysis have resulted in the ability to produce many new polymers having improved physical and chemical properties useful in a wide variety of superior products and applications. With the development of new catalysts, the choice of polymerization (solution, slurry, high pressure or gas phase) for producing a particular polymer have been greatly expanded. Also, advances in polymerization technology have provided more efficient, highly productive and economically enhanced processes. Especially illustrative of these advances is the development of the technology field utilizing metallocene catalyst systems.

As with any new technology field, particularly in the polyolefins industry, a small savings in cost often determines whether a commercial endeavor is even feasible. This aspect of the metallocene technology field is evident by the number of participants in the industry looking for new ways to reduce cost. In particular, there has been tremendous focus in the industry on developing new and improved metallocene catalyst systems. Some have focused on designing the catalyst systems to produce new polymers, others on improved operability, and many more on improving catalyst productivity. The productivity of a catalyst, that is, the amount of polymer produced per gram of the catalyst, usually is the key economic factor that can make or break a new commercial development in the polyolefin industry. Reactor operability—lack of fouling and sheeting, etc., of the polymerization reactor—is also a major concern for polyolefin producers. Reducing the occurrence of reactor fouling has commercial benefits in reduced down time for the reactor and improved output of polyolefin resin, as well as higher quality resin.

From the early stages in the metallocene technology field, beginning with the discovery of the utility of alumoxane as a cocatalyst in the early 1980's, to the discovery of substitutions on the bulky ligands of the metallocene compounds, through the development of non-coordinating anions, and today with the ever-increasing number of new metallocene bulky ligand compounds, catalyst productivity has been a primary focus.

Considering the discussion above, there is still a need for higher productivity catalyst systems capable of providing the efficiencies necessary for implementing commerical polyolefin processes. Further, it has been found, especially in gas phase fluidized bed processes, that reactor performance (presence or absence of reactor fouling, sheeting, etc.) is an issue when using supported metallocene catalysts. Secondary additives or support "surface modifiers" are often used to reduce fouling and hence improve commercial performance of the reactor. Addition of these surface modifiers, however, adds cost and complexity to the polymerization process. Thus, it would be highly advantageous to have a polymerization process and catalyst system capable of producing polyolefins with improved catalyst productivities and reactor performance.

BRIEF DESCRIPTION OF THE DRAWINGS

A more complete understanding of the present disclosure and advantages thereof may be acquired by referring to the following description taken in conjunction with the accompanying drawings, wherein.

Figure 1:
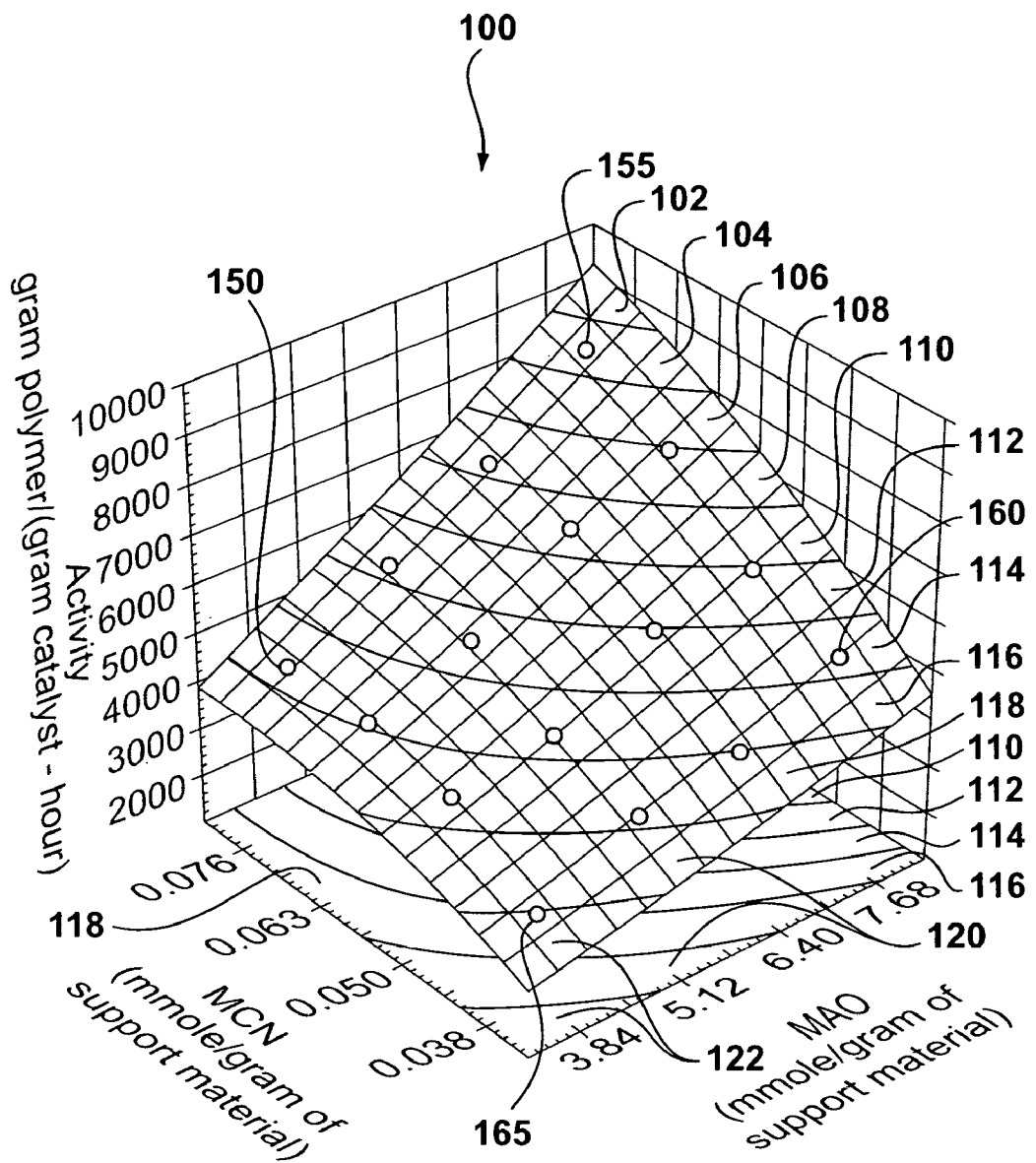
FIG. 1 is a plot illustrating the relationship between the metallocene (MCN) concentration and the methylaluminoxane (MAO) concentration of an exemplary embodiment of a catalyst composition of the present invention, with the corresponding activity demonstrated when the exemplary catalyst composition was utilized in an exemplary embodiment of a polymerization process of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

SUMMARY OF THE INVENTION

The present invention relates to a polymerization process using improved metallocene catalyst systems. The catalyst systems of the present invention relate to a metallocene catalyst compound having optimized metals loading and activator concentration, and demonstrate improved operability and productivity.

In one embodiment, the present invention provides a process of polymerizing olefins by contacting, in a reactor: (a) ethylene and at least one comonomer selected from the group consisting of C4 to C8 alpha olefins; and (b) a supported catalyst system comprising a metallocene catalyst compound activated by methylaluminoxane, and a support material, the methylaluminoxane being present in the range of from 3 to 9 mmole methylaluminoxane per gram of support material, the metallocene being present in the range of from 0.01 to 1.0 mmole metallocene per gram of support material. In this embodiment, the catalyst has an activity of at least 2,500 grams polyethylene per gram of catalyst compound per hour, and the process produces a polymer having a bulk density of at least 0.30 gram/cubic centimeter.

In another embodiment, the present invention provides a supported catalyst system with a metallocene catalyst compound activated by methylaluminoxane, and a support material. The methylaluminoxane is present in the range of from 3 to 9 mmole methylaluminoxane per gram of support material, and the metallocene is present in the range of from 0.01 to 1.0 mmole metallocene per gram of support material.

DETAILED DESCRIPTION OF THE INVENTION

Introduction

The present invention is generally directed toward a process for polymerizing olefins in the presence of a metallocene catalyst compound having an optimized metals loading and activator concentration, and in certain exemplary embodiments, a process for polymerizing ethylene and $C_3$ to $C_{20}$ olefins using a supported metallocene activated by methylaluminoxane (MAO).

In certain circumstances, as the ratio of metallocene to support material (the "metallocene loading") is increased for a constant ratio of MAO to support material ("MAO loading"), the activity of the catalyst increases without a corresponding undesirable increase in fouling, and the bulk density of the product resin may be constant or marginally reduced. Generally, as the metallocene loading is held constant, an increase in the MAO loading increases the catalyst activity, as well as the bulk density of the product resin, while maintaining the fouling characteristics of the catalyst within acceptable tolerances.

General Definitions

As used herein, in reference to Periodic Table "Groups" of Elements, the "new" numbering scheme for the Periodic Table Groups is used, as in the CRC HANDBOOK OF CHEMISTRY AND PHYSICS (David R. Lide ed., CRC Press 81$^{st}$ ed. 2000).

As used herein, the phrase "leaving group" refers to one or more chemical moieties bound to the metal center of the catalyst component, which can be abstracted from the catalyst component by an activator, thus producing a species active towards olefin polymerization or oligomerization. The activator is described further below.

As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed in manners that are commonly understood in the chemical arts. For example, the lines ("—") that are used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond" in general. As used herein, the phrase "chemical bond" is defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols, such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

The "Fouling Index" illustrates the operability of the catalyst. The higher the Fouling Index, the greater the fouling observed. A Fouling Index of zero indicates substantially no fouling, or no visible fouling. A Fouling Index of 1 indicates light fouling, for example, where a very light partial coating of polymer on the stirrer blades of a 2 liter slurry isobutane polymerization reactor, and/or no reactor body sheeting, are observed. A Fouling Index of 2 indicates more than light fouling, for example, where the stirrer blades have a heavier, painted-like, coating of polymer and/or the reactor body wall has some sheeting in a band of 1 to 2 inches (2.54 to 5.08 cm) wide on the reactor wall. A Fouling Index of 3 is considered medium fouling, for example, where the stirrer blade has a thicker, latex/like, coating of polymer on the stirrer blade, some soft chunks in the reactor, and/or some reactor body sheeting within a ban of 2 to 3 inches (5.08 to 7.62 cm) wide on the reactor wall. A Fouling Index of 4, for example, evidences more than medium fouling, where the stirrer has a thick, latex-like coating, some harder chunks/balls of polymer, and/or the reactor body wall sheeting band is from 3 to 4 inches (7.62 to 10.2 cm) wide.

Metallocene Catalyst Compounds

The catalyst system useful in the present invention includes at least one metallocene catalyst component as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material, in a particular exemplary embodiment as described further below, and may be supported with, or without, another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. In a more particular exemplary embodiment, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5 and 6 atoms in yet a more particular exemplary embodiment, and Ti, Zr, Hf atoms in yet a more particular exemplary embodiment, and Zr in yet a more particular exemplary embodiment. The oxidation state of the metal atom "M" may range from 0 to +7 in one exemplary embodiment; and in a more particular exemplary embodiment, may be +1, +2, +3, +4 or +5; and in yet a more particular exemplary embodiment may be +2, +3 or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \qquad (I)$$

wherein M is as described above;
each X is chemically bonded to M;
each Cp group is chemically bonded to M; and
n is 0 or an integer from 1 to 4, and either 1 or 2 in a particular exemplary embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one exemplary embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va–d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents R associated with formulas (I) through (Va–d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituents R include, but are not limited to, olefins such as olefinically unsaturated substituents including vinyl-terminated ligands such as, for example, 3-butenyl, 2-propenyl, 5-hexenyl and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulae/structures (II) through (Va–d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular exemplary embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular exemplary embodiment; and fluoride in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^BMx_n \qquad (II)$$

These bridged compounds represented by formula (II) are known as "bridged metallocenes". The elements $Cp^A$, $Cp^B$, M, X and n in structure (II) are as defined above for formula (I); wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $=Si(R')_2Si(R'_2)=$, $R'_2Ge=$, and $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one exemplary embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; as well as dimethylsilyl, diethylsilyl, dimethylgermyl and diethylgermyl.

In another exemplary embodiment, bridging group (A) may also be cyclic, having, for example, 4 to 10 ring members; in a more particular exemplary embodiment, bridging group (A) may have 5 to 7 ring members. The ring members may be selected from the elements mentioned above, and, in a particular exemplary embodiment, are selected from one or more of B, C, Si, Ge, N and O. Non-limiting examples of ring structures which may be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In a more particular exemplary embodiment, one or two carbon atoms are replaced by at least one of Si and Ge. The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents are, in one exemplary embodiment, selected from the group consisting of hydrocarbyl (e.g., alkyl, such as methyl) and halogen (e.g., F, Cl). The one or more Cp groups to which the above cyclic bridging moieties may optionally be fused may be saturated or unsaturated, and are selected from the group consisting of those having 4 to 10, more particularly 5, 6 or 7 ring members (selected from the group consisting of C, N, O and S in a particular exemplary embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one exemplary embodiment, and the same in another exemplary embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (III):

$$Cp^A(A)QMX_r \qquad (III)$$

wherein $Cp^A$ is defined above and is bound to M;

(A) is a bridging group bonded to Q and $Cp^A$; and an atom from the Q group is bonded to M; and r is an integer 0, 1 or 2.

In formula (III) above, $Cp^A$, (A) and Q may form a fused ring system. The X groups of formula (II) are as defined above in formula (I) and (II). In one exemplary embodiment, $Cp^A$ is selected from the group consisting of cyclopentadienyl, indenyl, tetrahydroindenyl, fluorenyl, substituted versions thereof, and combinations thereof.

In formula (II), Q is a heteroatom-containing ligand in which the bonding atom (the atom that is bonded with the metal M) is, in one exemplary embodiment, selected from the group consisting of Group 15 atoms and Group 16 atoms. In yet a more particular embodiment, the bonding atom is selected from the group consisting of nitrogen, phosphorus, oxygen or sulfur atoms. In still a more particular embodiment, the bonding atom is selected from the group consisting of nitrogen and oxygen. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds havinging Group 15 and Group 16 atoms capable of bonding with M.

In yet another aspect of the invention, the at least one metallocene catalyst component is an unbridged "half sandwich" metallocene represented by the formula (IVa):

$$Cp^AMQ_qX_w \qquad (IVa)$$

wherein $Cp^A$ is defined as for the Cp groups in (I) and is a ligand that is bonded to M;

each Q is independently bonded to M;

X is a leaving group as described above in (I);

w ranges from 0 to 3, and is 0 or 3 in one exemplary embodiment;

q ranges from 0 to 3, and is 0 or 3 in one exemplary embodiment.

In one exemplary embodiment, $Cp^A$ is selected from the group consisting of cyclopentadienyl, indenyl, tetrahydroindenyl, fluorenyl, substituted version thereof, and combinations thereof. In formula (IVa), Q is selected from the group consisting of ROO−, RO—, R(O)—, —NR—, —CR$_2$—, —S—, —NR$_2$, —CR$_3$, —SR, —SiR$_3$, —PR$_2$, —H, and substituted and unsubstituted aryl groups, R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

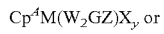

$$T(Cp^4M(W_2GZ)X_y)_m \quad \text{(IVb)}$$

wherein M, $Cp^4$, and X are as defined above;

$W_2GZ$ forms a polydentate ligand unit (e.g., pivalate), wherein at least one of the W groups form a bond with M, and is defined such that each W is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when W is —NR—, then Z is selected from the group consisting of —OR, —NR$_2$, —SR, —SiR$_3$, —PR$_2$; and provided that neutral valency for W is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

y is 1 or 2 in a particular embodiment;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(W_2GZ)X_y$" groups, and is chemically bonded to the $Cp^4$ groups; and m is an integer from 1 to 7. In an exemplary embodiment, m is an integer from 2 to 6.

In another aspect of the invention, the metallocene catalyst component can be described more particularly in structures (Va), (Vb), (Vc) and (Vd):

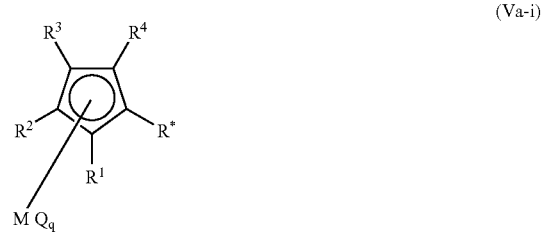

(Va-i)

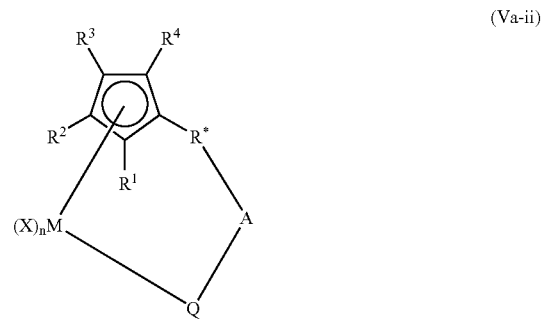

(Va-ii)

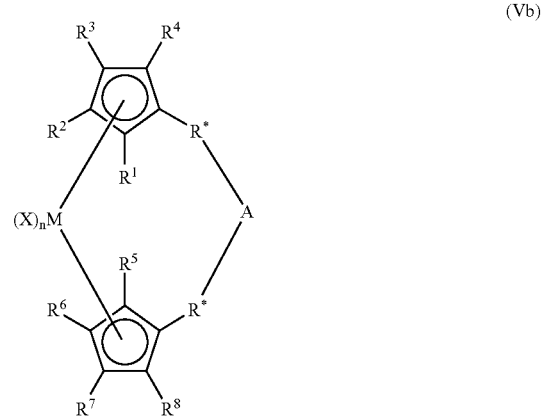

(Vb)

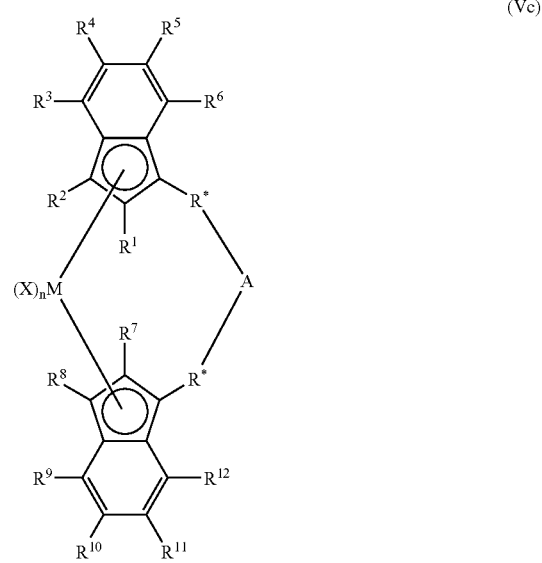

(Vc)

-continued

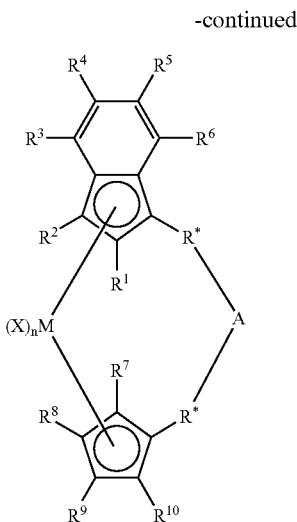

(Vd)

wherein in structures (Va) to (Vd) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va–i) and (Va–ii) is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates;

q is an integer ranging from 1 to 3;

wherein each R* is independently: selected from the group consisting of hydrocarbyls and heteroatom-containing hydrocarbyls in one exemplary embodiment; and selected from the group consisting of alkylenes, substituted alkylenes and heteroatom-containing hydrocarbyls in another exemplary embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbons in a more particular embodiment; and selected from the group consisting of $C_1$ to $C_4$ alkylenes in yet a more particular embodiment; and wherein both R* groups are identical in another exemplary embodiment in structures (Vb–d);

A is as described above for (A) in structure (II), and more particularly, selected from the group consisting of —O—, —S—, —$SO_2$—, —NR—, =$SiR_2$, =$GeR_2$, =$SnR_2$, —$R_2SiSiR_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one exemplary embodiment; and selected from the group consisting of $C_5$ to $C_8$ cyclic hydrocarbons, —$CH_2CH_2$—, =$CR_2$ and =$SiR_2$ in a more particular embodiment; wherein R is selected from the group consisting of alkyls, cycloalkyls, aryls, alkoxys, fluoroalkyls and heteroatom-containing hydrocarbons in one exemplary embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another exemplary embodiment, in which case each R* is defined as for $R^1$-$R^{12}$;

each X is as described above in (I);

n is an integer from 0 to 4, and from 1 to 3 in another exemplary embodiment, and 1 or 2 in yet another exemplary embodiment; and $R^1$ through $R^{12}$ are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in one exemplary embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular embodiment; wherein adjacent R groups may form a ring, either saturated, partially saturated, or completely saturated.

The structure of the metallocene catalyst component represented by (Va) may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213.

In a particular embodiment of the metallocene represented in (Vd), $R^1$ and $R^2$ form a conjugated 6-membered carbon ring system that may or may not be substituted.

Non-limiting examples of metallocene catalyst components consistent with the description herein include:

cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethyl-cyclopentadienyl)zirconium $X_n$, dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl(1,2,3,4-tetramethylcyclopentadienyl) (3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl)zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$,
dimethylsilyl(tetramethylcyclopentadieneyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecyclcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1-n-butyl-3-n-butylcyclopentadienyl)zirconium $X_n$,
bis(1,3-methyl-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
(tetramethyl cyclopentadienyl) (n-propyl cyclopentadienyl) zirconium $X_n$,
(pentamethyl cyclopentadienyl) (n-propyl cyclopentadienyl) zirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$,
dimethylsilyl(tetramethylcyclopentadienyl)(cyclooctylamido)titanium $X_n$,
dimethylsilyl(tetramethylcyclopentadienyl)(cyclononylamido)titanium $X_n$, dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido)titanium $X_n$,
dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium, $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleyclopentadienyl)(n-octylamido)titanium $X_n$,
diphenylsilyl(tetramethyleyclopentadienyl)(n-decylamido)titanium $X_n$,
diphenylsilyl(tetramethylcyclopentadienyl)(n-octadecylamido)titanium $X_n$, and derivatives thereof, wherein the value of n is 1, 2 or 3. The phrase "derivatives thereof" will be understood to mean any substitution or ring formation as described above for structures (Va–d) in one exemplary embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine, chlorine, or bromine.

It is contemplated that the metallocene catalysts components described above include their structural or optical or enantiomeric isomers (racemic mixture), and, in one exemplary embodiment, may be a pure enantiomer.

As used herein, a single, bridged, asymmetrically substituted metallocene catalyst component having a racemic and/or meso isomer does not, itself, constitute at least two different bridged, metallocene catalyst components.

The "metallocene catalyst component" useful in the present invention may include any combination of any "embodiment" described herein.

Activator and Activation Methods for the Metallocene Catalyst Compounds

The activator used with the catalyst compositions of the present invention is methylaluminoxane ("MAO"). A suitable source of MAO is a 30 wt % MAO solution commercially available from Albemarle Corporation, of Baton Rouge, La. Generally, MAO is present in the catalyst compositions of the present invention in an amount in the range of from 3 to 9 mmole MAO/gram of support material. In certain preferred embodiments, the MAO is present in an amount in the range of from 4 to 7.7 mmole MAO/gram of support material. In certain more preferred embodiments, the MAO is present in an amount in the range of from 5 to 6.5 mmole MAO/gram of support material. In certain most preferred embodiments, the MAO is present in an amount in the range of from 6 to 6.5 mmole MAO/gram of support material. The MAO activator may be associated with or bound to a support, either in association with the catalyst component (e.g., metallocene) or separate from the catalyst component, such as described by Gregory G. Hlatky, *Heterogeneous Single-Site Catalysts for Olefin Polymerization*, 100(4) CHEMICAL REVIEWS 1347–1374 (2000).

Generally, an increase in the amount of MAO present in the catalyst compositions of the present invention, with all other variables being held constant, tends to increase the activity demonstrated by the catalyst composition when used in the polymerization processes of the present invention, as well as increase the bulk density of the polymer product that is produced, and also increase the reactor Fouling Index that is observed.

For example, the polymerization processes of the present invention, using catalyst systems having MAO present in an amount in the range of from 3 to 9 mmole MAO/gram of support material, generally have a reactor Fouling Index in the range of from 0 to 2; a catalyst activity of at least 2,500 gram polymer per gram catalyst per hour; and produce a polymer product having a bulk density of at least 0.30 gram per cubic centimeter. In certain preferred embodiments wherein the MAO is present in the catalyst system in the range of from 4 to 7.7 mmole MAO/gram of support material, the activity is increased to at least 2,800 gram polymer per gram catalyst per hour; and polymer product is produced that has a bulk density of at least 0.35 gram per cubic centimeter. In certain more preferred embodiments wherein the MAO is present in the catalyst system in the range of from 5 to 6.5 mmole MAO/gram of support material, the activity is increased to at least 3,500 gram polymer per gram catalyst per hour; the reactor Fouling Index is reduced to 0; and polymer product is produced that has a bulk density of at least 0.39 gram per cubic centimeter. In certain most preferred embodiments wherein the MAO is present in the catalyst system in the range of from 6 to 6.5 mmole MAO/gram of support material, the activity is increased to at least 4,000 gram polymer per gram catalyst per hour; the Fouling Index is 0; and polymer product is produced that has a bulk density of at least 0.45 gram per cubic centimeter.

Referring now to FIG. 1, depicted therein at 100 is a plot illustrating the relationship between the metallocene (MCN) concentration and the methylaluminoxane (MAO) concentration of an exemplary embodiment of a catalyst composition of the present invention, with the corresponding activity demonstrated when the exemplary catalyst composition was used in an exemplary embodiment of a polymerization process of the present invention. At 150 is illustrated an exemplary catalyst composition having a metallocene concentration of 0.076 mmole/gram of support material, and a MAO concentration of 3.84 mmole/gram of support material, which, when used in an exemplary embodiment of a polymerization process of the present invention, demonstrated an activity of 4,400 gram polymer per gram catalyst hour. At 155 is illustrated an exemplary catalyst composition also having a metallocene concentration of 0.076 mmole/gram of support material, and having a MAO concentration of 7.68 mmole/gram of support material, which, when used in an exemplary embodiment of a polymerization process of the present invention, demonstrated an activity of 8,319 gram polymer per gram catalyst hour. At 160 is illustrated an exemplary catalyst composition having a metallocene concentration of 0.038 mmole/gram of support material, and having a MAO concentration of 7.68 mmole/gram of support material, which, when used in an exemplary embodiment of a polymerization process of the present invention, demonstrated an activity of 5,173 gram polymer per gram catalyst hour. At 165 is illustrated an exemplary catalyst composition having a metallocene concentration of 0.038 mmole/gram of support material, and having a MAO concentration of 3.84 mmole/gram of support material, which, when used in an exemplary embodiment of a polymerization process of the present invention, demonstrated an activity of 2,823 gram polymer per gram catalyst hour. As the foregoing description of four reference points depicted in FIG. 1 illustrates, exemplary catalyst compositions having, for example, comparatively lower MAO and metallocene concentrations demonstrated lower activity when used in exemplary polymerization processes of the present invention than did exemplary catalyst compositions having, for example, comparatively higher MAO and metallocene concentrations.

The relationship between an exemplary catalyst composition's concentration of MAO and metallocene, and the activity that may be realized from the use of such exemplary composition in an exemplary polymerization process may be further evaluated by examination of the activity regions (e.g., Region 102, 104, 106, 108, 110, 112, 114, 116, 118, 120 and 122) depicted in FIG. 1 and summarized in the table below.

TABLE 1

| Region | Activity Range (gram polymer/gram catalyst · hour) |
| --- | --- |
| 122 | less than 3,003 |
| 120 | 3003 to 3,623 |
| 118 | 3,623 to 4,243 |
| 116 | 4,243 to 4,863 |
| 114 | 4,863 to 5,482 |
| 112 | 5,482 to 6,102 |
| 110 | 6,102 to 6,722 |
| 108 | 6,722 to 7,342 |
| 106 | 7,342 to 7,962 |
| 104 | 7,962 to 8,582 |
| 102 | above 8,582 |

For example, an exemplary catalyst composition (depicted at 155) having a metallocene concentration of 0.076 mmole/gram of support material, and having a MAO concentration of 7.68 mmole/gram of support material, demonstrated an activity of 8,319 gram polymer per gram catalyst·hour when used in an exemplary embodiment of a polymerization process of the present invention, and is therefore located in activity region 104 of FIG. 1. Similarly, an exemplary catalyst composition (depicted at 165) having a metallocene concentration of 0.038 mmole/gram of support material, and having a MAO concentration of 3.84 mmole/gram of support material, demonstrated an activity of 2,823 gram polymer per gram catalyst·hour when used in an exemplary embodiment of a polymerization process of the present invention, and is therefore located in activity region 122 of FIG. 1.

Figure 2:
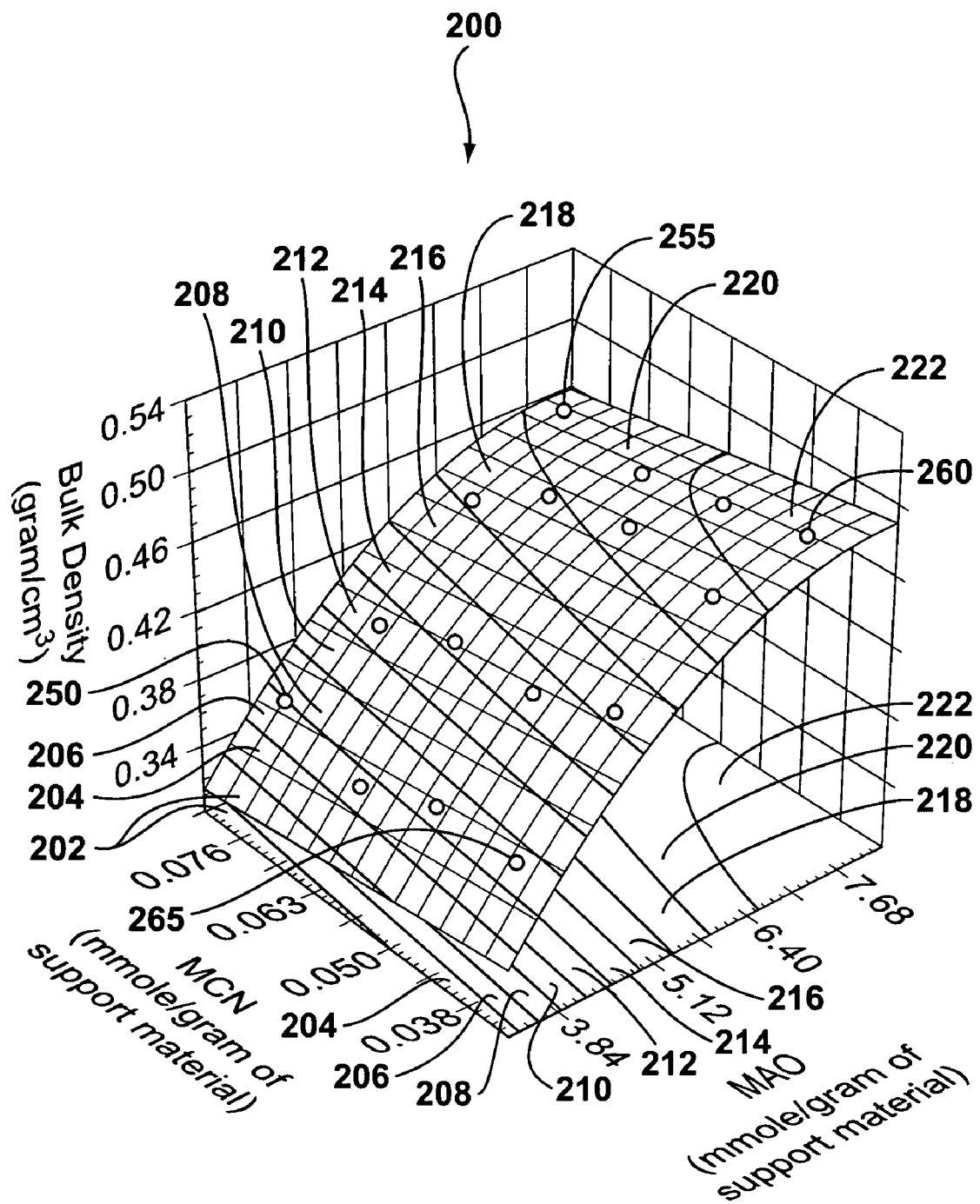
FIG. 2 is a plot illustrating the relationship between the metallocene (MCN) concentration and the methylaluminoxane (MAO) concentration of an exemplary embodiment of a catalyst composition of the present invention, with the corresponding bulk density of the polymer produced when the exemplary catalyst composition was utilized in an exemplary embodiment of a polymerization process of the present invention.

Referring now to FIG. 2, depicted therein at 200 is a plot illustrating the relationship between the metallocene (MCN) concentration and the methylaluminoxane (MAO) concentration of an exemplary embodiment of a catalyst composition of the present invention, with the corresponding bulk density of the polymer produced when the exemplary catalyst composition was utilized in an exemplary embodiment of a polymerization process of the present invention. At 250 is illustrated an exemplary catalyst composition having a metallocene concentration of 0.076 mmole/gram of support material, and a MAO concentration of 3.84 mmole/gram of support material, which, when used in an exemplary embodiment of a polymerization process of the present invention, produced a polymer having a bulk density of 0.37 grams per cubic centimeter. At 255 is illustrated an exemplary catalyst composition also having a metallocene concentration of 0.076 mmole/gram of support material, and having a MAO concentration of 7.68 mmole/gram of support material, which, when used in an exemplary embodiment of a polymerization process of the present invention, produced a polymer having a bulk density of 0.47 grams per cubic centimeter. At 260 is illustrated an exemplary catalyst composition having a metallocene concentration of 0.038 mmole/gram of support material, and having a MAO concentration of 7.68 mmole/gram of support material, which, when used in an exemplary embodiment of a polymerization process of the present invention, produced a polymer having a bulk density of 0.48 grams per cubic centimeter. At 265 is illustrated an exemplary catalyst composition having a metallocene concentration of 0.038 mmole/gram of support material, and having a MAO concentration of 3.84 mmole/gram of support material, which, when used in an exemplary embodiment of a polymerization process of the present invention, produced a polymer having a bulk density of 0.37 grams per cubic centimeter. As the foregoing description of four reference points depicted in FIG. 2 illustrates, exemplary catalyst compositions having, for example, comparatively lower MAO concentration produced polymer having a relatively lower bulk density when used in exemplary polymerization processes of the present invention than did exemplary catalyst compositions having, for example, comparatively higher MAO concentrations.

The relationship between an exemplary catalyst composition's concentration of MAO and metallocene, and the bulk density of the polymer that may be produced from the use of such exemplary composition in an exemplary polymerization process may be further evaluated by examination of the bulk density regions (e.g., Region 202, 204, 206, 208, 210, 212, 214, 216, 218, 220 and 222) depicted in FIG. 2 and summarized in the table below.

TABLE 2

| Region | Bulk Density Range (gram/cubic centimeter) |
| --- | --- |
| 202 | less than 0.33 |
| 204 | 0.33 to 0.346 |
| 206 | 0.346 to 0.362 |
| 208 | 0.362 to 0.378 |
| 210 | 0.378 to 0.394 |
| 212 | 0.394 to 0.41 |
| 214 | 0.41 to 0.426 |
| 216 | 0.426 to 0.442 |
| 218 | 0.442 to 0.458 |
| 220 | 0.458 to 0.474 |
| 222 | above 0.474 |

For example, an exemplary catalyst composition (depicted at 250) having a metallocene concentration of 0.076 mmole/gram of support material, and having a MAO concentration of 3.84 mmole/gram of support material, produced a polymer having a bulk density of 0.37 when used in an exemplary embodiment of a polymerization process of the present invention, and is therefore located in bulk density region 208 of FIG. 2. Similarly, an exemplary catalyst composition (depicted at 260) having a metallocene concentration of 0.038 mmole/gram of support material, and having a MAO concentration of 7.68 mmole/gram of support material, produced a polymer having a bulk density of 0.48 when used in an exemplary embodiment of a polymerization process of the present invention, and is therefore located in bulk density region 222 of FIG. 2.

Method for Supporting

A support may also be present as part of the catalyst system of the present invention. Supports, methods of supporting, modifying, and activating supports for single-site catalyst such as metallocenes are discussed in, for example, 1 METALLOCENE-BASED POLYOLEFINS 173–218 (J. Scheirs & W. Kaminsky eds., John Wiley & Sons, Ltd. 2000). The terms "support" or "carrier", as used herein, are used interchangeably and refer to any support material, including inorganic or organic support materials. In one exemplary embodiment, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

The support may be contacted with the other components of the catalyst system in any number of ways. In one exemplary embodiment, the support is contacted with the activator to form an association between the activator and support, or a "bound activator". In another exemplary embodiment, the catalyst component may be contacted with the support to form a "bound catalyst component". In yet another exemplary embodiment, the support may be contacted with the activator and catalyst component together, or with each partially in any order. The components may be contacted by any suitable means as in a solution, slurry, or solid form, or some combination thereof. In certain exemplary embodiments, the components may also be heated to a temperature in the range of from 25° C. to 250° C. while being contacted.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one exemplary embodiment. Other useful supports include magnesia, titania, zirconia, montmorillonite (as described in EP 0 511 665 B1), phyllosilicate, and the like. In certain exemplary embodiments, combinations of the support materials may be used, including, but not limited to, combinations such as silica-chromium, silica-alumina, silica-titania, and the like. Additional support materials may include those porous acrylic polymers described in EP 0 767 184 B1.

In one aspect of the support useful in the invention, the support possesses a surface area in the range of from 10 to 700 $m^2$/gram, a pore volume in the range of from 0.1 to 4.0 $cm^3$/gram and an average particle size in the range of from 5 to 500 μm. In another exemplary embodiment, the carrier has a surface area in the range of from 50 to 500 $m^2$/gram, a pore volume of from 0.5 to 3.5 $cm^3$/gram, and an average particle size of from 10 to 200 μm. In yet another exemplary embodiment, the carrier has a surface area in the range of from 100 to 400 $m^2$/gram, a pore volume from 0.8 to 3.0 $cm^3$/gram, and an average particle size of from 5 to 100 μm. In still another exemplary embodiment, the carrier has a surface area in the range of from from 150 to 450 $m^2$/gram, a pore volume in the range of from 1 to 2.5 $cm^3$/gram and an average particle size in the range of from 10 to 50 μm. In another exemplary embodiment, the carrier has a surface area in the range of from 250 to 400 $m^2$/gram, a pore volume of from 1.25 to 2.0 $cm^3$/gram, and an average particle size of from 15 to 40 μm. In yet another exemplary embodiment, the carrier has a surface area in the range of from 300 to 350 $m^2$/gram, a pore volume in the range of from 1.5 to 1.75 $cm^3$/gram, and an average particle size of from 20 to 30 μm. Generally, the average pore size of the carrier ranges from 10 to 1000 Å. In one exemplary embodiment, the average pore size of the carrier is in the range of from 50 to 500 Å, while in yet another exemplary embodiment the average pore size ranges from 75 to 350 Å.

In one exemplary embodiment of the present invention, the support is graphite. In one exemplary embodiment, the graphite is a powder; in another exemplary embodiment, the graphite is flake graphite. In another exemplary embodiment, the graphite has a particle size of from 1 to 500 microns. In still another exemplary embodiment, the graphite has a particle size ranging from 1 to 400 microns, while in yet another exemplary embodiment, the graphite has a particle size in the range of from 1 to 200 microns. In yet another exemplary embodiment, the graphite has a particle size in the range of from 1 to 100 microns.

Dehydration or calcining of the support may also be carried out. In one exemplary embodiment, the support is calcined prior to reaction with the fluorine or other support-modifying compound. In another exemplary embodiment, the support is calcined and used without further modification, or calcined, then contacted with one or more activators and/or catalyst components. Suitable calcining temperatures range from 100° C. to 1500° C. in one exemplary embodiment, and from 200° C. to 1200° C. in another exemplary embodiment, and from 300° C. to 1000° C. in another exemplary embodiment, and from 350° C. to 900° C. in yet another exemplary embodiment, and from 400° C. to 850° C. in yet a more particular exemplary embodiment, and from 800° C. to 900° C. in yet a more particular exemplary embodiment, and from 810° C. to 890° C. in yet a more particular exemplary embodiment, wherein a desirable range includes any combination of any upper temperature limit with any lower temperature limit. Calcining may take place in the absence of oxygen and moisture by using, for example, an atmosphere of dry nitrogen.

The support, especially an inorganic support or graphite support, may be pretreated such as by a halogenation process or other suitable process that, for example, associates a chemical species with the support either through chemical bonding, ionic interactions, or other physical or chemical interaction. In one exemplary embodiment, the support is fluorided. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$.

A desirable method of treating the support with the fluorine compound is to dry mix the two components by simply blending them at a concentration of from 0.01 to 10.0 millimole F/g of support in one exemplary embodiment, and in the range of from 0.05 to 6.0 millimole F/g of support in another exemplary embodiment, and in the range of from 0.1 to 3.0 millimole F/g of support in yet another exemplary embodiment. The fluorine compound can be dry mixed with the support either before or after the support is charged to the vessel for dehydration or calcining. Accordingly, the fluorine concentration present on the support is in the range of from 0.2 to 5 wt % in one exemplary embodiment, and from 0.6 to 3.5 wt % of support in another exemplary embodiment.

Another method of treating the support with the fluorine compound is to dissolve the fluorine in a solvent, such as water, and then contact the support with the fluorine containing solution (at the concentration ranges described herein). When water is used and silica is the support, it is desirable to use a quantity of water that is less than the total pore volume of the support. Desirably, the support and, for example, fluorine compounds are contacted by any suitable means, such as by dry mixing or slurry mixing at a temperature of from 100° C. to 1000° C. in one exemplary embodiment, and from 200° C. to 800° C. in another exemplary embodiment, and from 300° C. to 600° C. in yet another exemplary embodiment, the contacting in any case taking place for between two to eight hours.

It is within the scope of the present invention to co-contact (or "co-immobilize") more than one catalyst component with a support. Non-limiting examples of co-immobilized catalyst components include two or more of the same or different metallocene catalyst components, one or more metallocene catalyst components co-immobilized with a Ziegler-Natta type catalyst, one or more metallocene catalyst components co-immobilized with a chromium or "Phillips" type catalyst, one or more metallocene catalyst components co-immobilized with a Group 15-containing catalyst, and any of these combinations with one or more activators. More particularly, co-supported combinations include metallocene A/metallocene A; metallocene A/metallocene B; metallocene/Ziegler Natta; metallocene/Group 15 containing catalyst; metallocene/chromium catalyst; metallocene/Ziegler Natta/Group 15 containing catalyst; metallocene/chromium catalyst/Group 15 containing catalyst, any of these with an activator, and combinations thereof.

In an exemplary embodiment, the supported catalyst(s) are treated by combining them with the activators, and further combining them with up to 4.0 wt % (by weight of the catalyst composition) of an antistatic agent, such as an ethoxylated or methoxylated amine, an example of which is Atmer AS-990 (available from Ciba of Tarrytown, N.Y.). In certain other exemplary embodiments of the present invention, the concentrations of MAO and metallocene in the catalyst composition are optimized such that the antistatic agent is present in an amount less than 4.0 wt %, such as, for example, 2.0 wt %. In still other exemplary embodiments of the present invention, the concentrations of MAO and metallocene in the catalyst composition are optimized such that the antistatic agent is absent or substantially absent from the catalyst composition.

Polymerization Process

The polymerization process of the present invention may be carried out using any suitable process, such as, for example, solution, slurry, high pressure, and gas phase. A particularly desirable method for producing polyolefin polymers according to the present invention is a gas phase polymerization process preferably utilizing a fluidized bed reactor. This type reactor, and means for operating the reactor, are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

In general, the polymerization process of the present invention may be effected as a continuous gas phase process, such as a fluid bed process. A fluid bed reactor for use in the process of the present invention typically has a reaction zone and a so-called velocity reduction zone. The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

More particularly, the reactor temperature of the fluid bed process herein ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor.

The process of the present invention is suitable for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one exemplary embodiment; and in another exemplary embodiment, ethylene and a comonomer comprising from 3 to 12 carbon atoms in another exemplary embodiment; and ethylene and a comonomer comprising from 4 to 10 carbon atoms in yet another exemplary embodiment; and ethylene and a comonomer comprising from 4 to 8 carbon atoms in yet another exemplary embodiment. Polyethylenes are particularly preferred for preparation herein by the process of the present invention. Such polyethylenes are preferably homopolymers of ethylene and interpolymers of ethylene and at least one α-olefin wherein the ethylene content is at least about 50% by weight of the total monomers involved. Exemplary olefins that may be used herein are ethylene, propylene, 1-butene, 1-pentene, 1-hexene, 1-heptene, 1-octene, 4-methylpent-1-ene, 1-decene, 1-dodecene, 1-hexadecene and the like. Also usable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene, comonomers may be present in the polymerization reactor. When present, the comonomer may be present at any level with the ethylene monomer that will achieve the desired weight percent incorporation of the comonomer into the finished resin. In one exemplary embodiment of polyethylene production, the comonomer is present with ethylene in a mole ratio range of from 0.0001 (comonomer:ethylene) to 50, and from 0.0001 to 5 in another exemplary embodiment, and from 0.0005 to 1.0 in yet another exemplary embodiment, and from 0.001 to 0.5 in yet another exemplary embodiment. Expressed in absolute terms, in making polyethylene, the amount of ethylene present in the polymerization reactor may range to up to 1000 atmospheres pressure in one exemplary embodiment, and up to 500 atmospheres pressure in another exemplary embodiment, and up to 200 atmospheres pressure in yet another exemplary embodiment, and up to 100 atmospheres in yet another exemplary embodiment, and up to 50 atmospheres in yet another exemplary embodiment.

Hydrogen gas is often used in olefin polymerization to control the final properties of the polyolefin. Using the catalyst system of the present invention, it is known that increasing concentrations (partial pressures) of hydrogen increase the melt flow rate (MFR) and/or melt index (MI) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization processes of the present invention is an amount necessary to achieve the desired MFR or MI of the final polyolefin resin. In one exemplary embodiment, the mole ratio of hydrogen to total monomer ($H_2$:monomer) is in a range of from greater than 0.0001 in one exemplary embodiment, and from greater than 0.0005 in another exemplary embodiment, and from greater than 0.001 in yet another exemplary embodiment, and less than 10 in yet another exemplary embodiment, and less than 5 in yet another exemplary embodiment, and less than 3 in yet another exemplary embodiment, and less than 0.10 in yet another exemplary embodiment, wherein a desirable range may include any combination of any upper mole ratio limit with any lower mole ratio limit described herein. Expressed another way, the amount of hydrogen in the reactor at any time may range to up to 5000 ppm, and up to 4000 ppm in another exemplary embodiment, and up to 3000 ppm in yet another exemplary embodiment, and between 50 ppm and 5000 ppm in yet another exemplary embodiment, and between 500 ppm and 2000 ppm in another exemplary embodiment.

Further, it is common to use a staged reactor employing two or more reactors in series, wherein one reactor may produce, for example, a high molecular weight component and another reactor may produce a low molecular weight component. In one exemplary embodiment of the invention, the polyolefin is produced using a staged gas phase reactor. Such commercial polymerization systems are described in, for example, 2 METALLOCENE-BASED POLYOLEFINS 366–378 (John Scheirs & W. Kaminsky, eds. John Wiley & Sons, Ltd. 2000); U.S. Pat. Nos. 5,665,818, 5,677,375, and EP-A-0 794 200.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another exemplary embodiment, and in the range of from 250 psig (1724 kPa) to 350 psig (2414 kPa) in yet another exemplary embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another exemplary embodiment, and greater than 10,000 lbs/hr (4,540 Kg/hr) in yet another exemplary embodiment, and greater than 25,000 lbs/hr (11,300 Kg/hr) in yet another exemplary embodiment, and greater than 35,000 lbs/hr (15,900 Kg/hr) in yet another exemplary embodiment, and greater than 50,000 lbs/hr (22,700 Kg/hr) in yet another exemplary embodiment, and from 65,000 lbs/hr (29,000 Kg/hr) to 100,000 lbs/hr (45,500 Kg/hr) in yet another exemplary embodiment, and from 120,000 lbs/hr (54,500 Kg/hr) to 150,000 lbs/hr (68,000 Kg/hr) in yet another exemplary embodiment.

In one exemplary embodiment of the invention, the polymerization process is a continuous gas phase process that includes the steps of:
(a) introducing a recycle stream (including ethylene and alpha olefin monomers) into the reactor;
(b) introducing the supported catalyst system;
(c) withdrawing the recycle stream from the reactor;
(d) cooling the recycle stream;
(e) introducing into the reactor additional monomer(s) to replace the monomer(s) polymerized;
(f) reintroducing the recycle stream or a portion thereof into the reactor; and (g) withdrawing a polymer product from the reactor.

A slurry polymerization process generally uses pressures in the range of from 1 to 50 atmospheres and even greater, and temperatures in the range of 0° C. to 120° C. In a slurry polymerization, a suspension of solid, particulate polymer is formed in a liquid polymerization diluent medium to which ethylene and comonomers and often hydrogen along with catalyst are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used, the process must be operated above the reaction diluent critical temperature and pressure. In one embodiment, a hexane or an isobutane medium is employed.

Another desirable polymerization technique of the invention is referred to as a particle form polymerization, or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 METALLOCENE-BASED POLYOLEFINS 322–332 (2000).

The slurry reactor employing the catalyst system described herein is capable of producing greater than 2000 lbs of polymer per hour (907 Kg/hr), and greater than 5000 lbs/hr (2268 Kg/hr) in another embodiment, and greater than 10,000 lbs/hr (4540 Kg/hr) in yet another embodiment. In another embodiment, the slurry reactor used in the process of the invention produces greater than 15,000 lbs of polymer per hour (6804 Kg/hr), and from 25,000 lbs/hr (11,340 Kg/hr) to 100,000 lbs/hr (45,500 Kg/hr) in yet another embodiment.

In one exemplary embodiment of the process of the invention, the slurry or gas phase process is operated in the presence of a bulky ligand metallocene-type catalyst system of the invention and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

As noted above, the polymerization process of the present invention may be carried out by using a solution process. Nonlimiting examples of solution processes are described in, for example, U.S. Pat. Nos. 4,271,060, 5,001,205, 5,236, 998, and 5,589,555.

In another exemplary embodiment, one or all of the catalysts are combined with up to 15 wt % of a metal-fatty acid compound, such as, for example, an aluminum stearate, based upon the weight of the catalyst system (or its components), such as disclosed in, for example, U.S. Pat. Nos. 6,300,436 and 5,283,278. Other suitable metals include other Group 2 and Group 5–13 metals. In an alternate embodiment, a solution of the metal-fatty acid compound is fed into the reactor. In yet another exemplary embodiment, the metal-fatty acid compound is mixed with the catalyst and fed into the reactor separately. These agents may be mixed with the catalyst or may be fed into the reactor in a solution or a slurry with or without the catalyst system or its components.

The polymerization processes of the present invention use improved metallocene catalyst systems having optimized metals loading and activator concentration. More particularly, the metallocene and activator concentrations in the improved metallocene catalyst systems of the present invention are, in one exemplary embodiment, selected so as to maximize both the catalyst activity as well as the bulk density of the polymer product, while also maximizing the operability of the catalyst (e.g., minimizing the Fouling Index). Generally, the metallocene catalyst is present in the improved metallocene catalyst systems of the present invention in an amount in the range of from 0.01 to 1.0 mmole metallocene per gram of support material. In certain preferred embodiments, the metallocene catalyst is present in the improved metallocene catalyst systems of the present invention in an amount in the range of from 0.04 to 0.1 mmole metallocene per gram of support material. In certain more preferred embodiments, the metallocene catalyst is present in the improved metallocene catalyst systems of the present invention in an amount in the range of from 0.05 to 0.08 mmole metallocene per gram of support material. In certain most preferred embodiments, the metallocene catalyst is present in the improved metallocene catalyst systems of the present invention in an amount in the range of from 0.06 to 0.07 mmole metallocene per gram of support material. Generally, an increase in the amount of metallocene present in the catalyst compositions of the present invention, with all other variables being held constant, tends to increase the activity demonstrated by the catalyst composition when used in the polymerization processes of the present invention, and slightly decrease the bulk density of the polymer product that is produced. The amount of metallocene present in the catalyst compositions of the present invention, with all other variables being held constant, generally does not affect the reactor Fouling Index that is observed.

For example, the polymerization processes of the present invention, using catalyst systems having a metallocene catalyst concentration in an amount in the range of from 0.01 to 1.0 mmole metallocene/gram support material, generally have a reactor Fouling Index in the range of from 0 to 2; a catalyst activity of at least 2,500 gram polymer per gram catalyst per hour; and produce a polymer product having a bulk density of at least 0.30 gram per cubic centimeter. In certain preferred embodiments wherein the metallocene catalyst concentration is in the range of from 0.04 to 0.1 mmole metallocene/gram of support material, the Fouling Index remains in the range of from 0 to 2; and the activity is increased to at least 2,800 gram polymer per gram catalyst per hour. In certain more preferred embodiments wherein the metallocene catalyst concentration is in the range of from 0.05 to 0.08 mmole metallocene/gram of support material, the activity is increased to at least 4,000 gram polymer per gram catalyst per hour. In certain most preferred embodiments wherein the metallocene catalyst concentration is in the range of from 0.06 to 0.07 mmole metallocene/gram of support material, the activity is increased to at least 4,200 gram polymer per gram catalyst per hour.

The polymerization process may be optimized by modulating the metallocene concentration and the MAO concentration in the catalyst system so as to maximize both the catalyst activity as well as the bulk density of the polymer product, while minimizing the reactor Fouling Index. For example, in one embodiment of the present invention, the catalyst system has a metallocene concentration in the range of from 0.05 to 0.08 mmole metallocene/gram of support material, and a MAO concentration in the range of from 5.5 to 6.5 mmole MAO/gram of support material, thereby reducing the Fouling Index to 0 while increasing the catalyst activity to at least 5,600 gram polymer per gram catalyst per hour, and increasing the bulk density of the polymer product to at least 0.45 gram per cubic centimeter. In another exemplary embodiment of the present invention, the catalyst system has a metallocene concentration in the range of from 0.06 to 0.07 mmole metallocene/gram of support material, and a MAO concentration in the range of from 6 to 6.5 mmole MAO/gram of support material, thereby reducing the Fouling Index to 0 while increasing the catalyst activity to at least 6,000 gram polymer per gram catalyst per hour, and increasing the bulk density of the polymer product to at least 0.46 gram per cubic centimeter.

In an exemplary embodiment, the present invention provides a process of polymerizing olefins wherein: (a) ethylene and at least one comonomer selected from the group consisting of C4 to C8 alpha olefins; and (b) a supported catalyst system including a metallocene catalyst compound activated by methylaluminoxane, and a support material, the methylaluminoxane being present in the range of from 3 to 9 mmole methylaluminoxane per gram of support material, the metallocene being present in the range of from 0.01 to 1.0 mmole metallocene per gram of support material; are contacted in a reactor; wherein the catalyst has an activity of at least 2,500 grams polyethylene per gram of catalyst compound per hour; and the process produces a polymer having a bulk density of at least 0.30 gram/cubic centimeter.

Polymer Product of the Invention

The polyolefins of the present invention may be blended with additives to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from 0.01 to 50 wt % in one exemplary embodiment, and from 0.1 to 20 wt % in another exemplary embodiment, and from 1 to 5 wt % in yet another exemplary embodiment, wherein a desirable range may include any combination of any upper wt % limit with any lower wt % limit.

In particular, antioxidants and stabilizers such as organic phosphites, hindered amines, and phenolic antioxidants may be present in the polyolefin compositions of the invention from 0.001 to 5 wt % in one exemplary embodiment, from 0.01 to 0.8 wt % in another exemplary embodiment, and from 0.02 to 0.5 wt % in yet another exemplary embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)symtriazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butly-4-hydroxyphenyl) propionate (IRGANOX 1010); and 1,3,5-Tri(3,5-di-tert-butyl-4-hydroxybenzyl-isocyanurate (IRGANOX 3114).

Fillers may be present from 0.1 to 50 wt % in one exemplary embodiment, and from 0.1 to 25 wt % of the composition in another exemplary embodiment, and from 0.2 to 10 wt % in yet another exemplary embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions of the present invention. Such salts may be present from 0.001 to 2 wt % of the composition in one exemplary embodiment, and from 0.01 to 1 wt % in another exemplary embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of polyolefin and one or more additives, sufficient mixing should take place to assure that a uniform blend will be produced prior to conversion into a finished product. The polyolefin suitable for use in the present invention can be in any physical form when used to blend with the one or more additives. In one exemplary embodiment, reactor granules (defined as the granules of polymer that are isolated from the polymerization reactor) are used to blend with the additives. The reactor granules have an average diameter of from 10 µm to 5 mm, and from 50 µm to 10 mm in another exemplary embodiment. Alternately, the polyolefin is in the form of pellets, such as, for example, pellets having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

The resultant polyolefin and polyolefin compositions of the present invention may be further processed by any suitable means such as by calendering, casting, coating, compounding, extrusion, foaming; all forms of molding including compression molding, injection molding, blow molding, rotational molding, and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

In the case of injection molding of various articles, simple solid state blends of the pellets serve equally as well as pelletized melt state blends of raw polymer granules, of granules with pellets, or of pellets of the two components, since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polymers of the present invention, in one exemplary embodiment, have a melt index (MI) or ($I_2$) as measured by ASTM-D-1238-E (190/2.16) in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min, and even more preferably from 0.1 dg/min to 5 dg/min.

The polymers of the present invention, in one exemplary embodiment, have a melt index ratio ($I_{21}/I_2$) ($I_{21}$ is measured by ASTM-D-1238-F, [190/21.6]) of from 5 to 300, more preferably from about 10 to less than 250, and from 15 to 200 in yet another exemplary embodiment, and from 20 to 180 in yet another exemplary embodiment, and from 15 to 30 in yet another exemplary embodiment, and from 10 to 40 in yet another exemplary embodiment, and from 5 to 50 in yet another exemplary embodiment, wherein a desirable range may include any combination of any upper limit with any lower limit.

The polymers of the present invention have a bulk density measured in accordance with ASTM-D-1238 that, in one exemplary embodiment, is greater than at least 0.30 grams per cubic centimeter. In another exemplary embodiment, the bulk density of the polymers is in the range of 0.30 to 0.50 grams per cubic centimeter.

Common rheological properties, processing methods and end use applications of metallocene based polyolefins are discussed in, for example, 2 METALLOCENE-BASED POLYOLEFINS 400–554 (John Scheirs & W. Kaminsky, eds. John Wiley & Sons, Ltd. 2000). The polyolefinic compositions of the present invention are suitable for such articles as films, fibers and nonwoven fabrics, extruded articles and molded. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Other desirable articles that can be made from and/or incorporate the polyolefins of the present invention include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods may be formed economically or incorporate the polyolefins produced by the practice of our invention including: crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

EXAMPLES

In order to provide a better understanding of the present invention, including representative advantages thereof, the following examples of some exemplary embodiments are offered. In no way should such examples be read to limit the scope of the invention.

The catalyst composition and the polymer produced in the Examples were tested and synthesized as follows: A 2 liter autoclave reactor under a nitrogen purge was charged with 0.16 mmoles triethylaluminum (TEAL), followed by 60 cubic centimeters (cc) of 1-hexene comonomer and 800 cc of isobutane diluent. The contents of the reactor were heated to 80° C., after which 100 mg of each of the supported polymerization catalysts prepared in Examples 1 to 27 (the preparation of which is described further below) were each separately polymerized as follows: each polymerization catalyst was introduced concurrently with ethylene into the reactor to make up a total reactor pressure of 325 psig (2,240 kPa). The reactor temperature was maintained at 85° C. and the polymerization was allowed to proceed for 40 minutes. After 40 minutes the reactor was cooled, ethylene was vented off, and the polymer dried and weighed to obtain the polymer yield. Tables 1 through 5 below provide polymerization results, along with the fouling characteristics observed, and other physical properties of the polymers.

Density was measured in accordance with ASTM-D-1238. Catalyst activity was measured in grams of polyethylene (PE) per gram of polymerization catalyst in one hour (gPE/gCat·h).

Example Set A

Preparation of Supported Metallocene Catalyst

Example 1

In a 125 ml glass vial equipped with a stirring bar and under anaerobic conditions was added 20 ml of toluene, and 6.64 ml of a 30 wt % methylaluminoxane (MAO) solution (1.85 gram MAO, 6.40 mmol/gram silica) (available from Albemarle Corporation of Baton Rouge, La.). While stirring, 0.082 grams (0.038 mmol/gram silica) of bis(1,3-methyl-n-butylcyclopentadienyl) zirconium difluoride metallocene dissolved in 2 ml of toluene were added to the glass vial. The mixture was stirred at room temperature (25° C.) for 15 minutes, after which 5 grams of ES-757 silica (dehydrated at 600° C.) (available from Ineos Silicas of Warrington, UK), was added to the solution. The ES-757 silica exhibits the following physical properties:

| Physical Properties | ES-757 |
| --- | --- |
| Surface Area ($M^2$/gram) | 316 |
| Pore Volume ($cm^3$/gram) | 1.59 |
| 10th % μ | 9 |
| 50th % μ | 25 |
| 90th % μ | 45 |

The mixture was then stirred for 15 minutes after which the catalyst was dried at 75° C. until the solid was free flowing.

Examples 2–8

The catalysts in Examples 2–8 were prepared similarly to the catalyst in Example 1 with the exception that the amount of MAO and metallocene (MCN) were adjusted in the manner shown in Table 3.

TABLE 3

| Example | mmole MAO g $SiO_2$ | mmole MCN g $SiO_2$ | Activity (gPE/gCat · h) | Fouling Index |
| --- | --- | --- | --- | --- |
| 1 | 6.40 | 0.038 | 4164 | 0 |
| 2 | 6.40 | 0.050 | 5532 | 0 |
| 3 | 6.40 | 0.063 | 6540 | 0 |
| 4 | 6.40 | 0.076 | 6811 | 0 |
| 5 | 3.84 | 0.063 | 4300 | 0 |
| 6 | 5.12 | 0.063 | 5133 | 0 |
| 7 | 6.40 | 0.063 | 6560 | 0 |
| 8 | 7.68 | 0.063 | 7580 | 1 |

Slurry Polymerizations Using the Catalysts in Examples 1–8

Polymerization was conducted as described above, and the activity and Fouling Index results for each catalyst sample are shown in Table 3. Results indicate that as the MCN amount was increased with a constant MAO loading, the activity of the catalyst increased and the fouling stayed the same. The data also show that as the MAO loading increased, at a constant MCN loading, the catalyst activity increased, but the fouling tendency increased.

Example Set B

Preparation of Supported Metallocene Catalyst

The catalysts in Examples 9–17 were prepared similarly to the catalyst in Example 1 with the exception that the amount of MAO and metallocene (MCN) were adjusted as shown in Table 4.

TABLE 4

| Example | mmole MAO g $SiO_2$ | mmole MCN g $SiO_2$ | Activity (gPE/gCat · h) | Fouling Index |
| --- | --- | --- | --- | --- |
| 9 | 7.68 | 0.038 | 5173 | 1 |
| 10 | 7.68 | 0.050 | 5870 | 1 |
| 11 | 7.68 | 0.063 | 7580 | 1 |
| 12 | 7.68 | 0.076 | 8500 | 2 |
| 13 | 3.84 | 0.038 | 2614 | 0 |
| 14 | 5.12 | 0.038 | 4082 | 0 |
| 15 | 6.40 | 0.038 | 4164 | 0 |

TABLE 4-continued

| Example | mmole MAO g $SiO_2$ | mmole MCN g $SiO_2$ | Activity (gPE/gCat · h) | Fouling Index |
| --- | --- | --- | --- | --- |
| 16 | 7.68 | 0.038 | 5173 | 1 |
| 17 | 8.96 | 0.038 | 5125 | 2 |

Slurry Polymerizations Using the Catalysts in Examples 9–17

Polymerization was conducted as described above and the results are shown in table 4. Results again indicate that the activity increased with increasing metals loading on the catalyst.

Example Set C

Preparation of Supported Metallocene Catalyst

The catalysts in Examples 18–27 were prepared similarly to the catalyst in Example 1, with the exception that the amount of MAO and metallocene (MCN) was adjusted as shown in tables 5 and 6.

TABLE 5

| Example | mmole MAO g $SiO_2$ | mmole MCN g $SiO_2$ | Resin Bulk Density (g/cc) |
| --- | --- | --- | --- |
| 18 | 6.40 | 0.038 | 0.48 |
| 19 | 6.40 | 0.050 | 0.48 |
| 20 | 6.40 | 0.063 | 0.45 |
| 21 | 6.40 | 0.076 | 0.45 |

TABLE 6

| Example | mmole MAO g $SiO_2$ | mmole MCN g $SiO_2$ | Resin Bulk Density (g/cc) |
| --- | --- | --- | --- |
| 22 | 3.84 | 0.063 | 0.35 |
| 23 | 5.12 | 0.063 | 0.41 |
| 24 | 6.40 | 0.063 | 0.45 |
| 25 | 6.40 | 0.038 | 0.47 |
| 26 | 7.68 | 0.038 | 0.48 |
| 27 | 8.96 | 0.038 | 0.48 |

The results illustrate, inter alia, that the resin bulk density stayed constant or marginally declined as MCN loading was increased. However, as the MAO loading was increased, as in Examples 23–27, the resin bulk density increased.

While the present invention has been described and illustrated by reference to particular exemplary embodiments, those of ordinary skill in the art will appreciate that the invention lends itself to variations not necessarily illustrated herein. For example, it is contemplated that metallocene catalyst compounds of the invention may be introduced into a reactor in a mineral oil slurry, or introduced to the process of the invention to boost activity or productivity, or simply to improve the operability of the process. For this reason, then, reference should be made solely to the appended claims for purposes of determining the true scope of the present invention.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

We claim:

1. A process of polymerizing olefins comprising contacting, in a reactor:
   (a) ethylene and at least one comonomer selected from the group consisting of $C_4$ to $C_8$ alpha olefins; and
   (b) a supported catalyst system comprising a metallocene catalyst compound activated by methylaluminoxane, and a support material, the methylaluminoxane being present on the range of from 3 to 7.7 mmole methylaluminoxane per gram of support material, the metallocene being present in the range of from 0.04 to 0.1 mmole metallocene per gram of support material;
   wherein the process produces a polyethylene copolymer having a bulk density of at least 0.30 gram/cubic centimeter; and
   wherein the support material is silica having an average particle size ranging from 10 to 40 μm, and
   wherein the metallocene catalyst compound is a substituted bis-cyclopentadienyl zirconocene catalyst compound comprising at least one fluoride or fluorine containing leaving group.

2. The process of claim 1 wherein the polymerization process is a gas phase process.

3. The process of claim 1 wherein the polymerization process is a slurry process.

4. The process of claim 1 wherein an antistatic agent is present in the catalyst composition in an amount less than 4% by weight of the catalyst composition.

5. The process of claim 4 wherein the antistatic agent is present in the catalyst composition in an amount in the range of from 0% to 2% by weight of the catalyst composition.

6. The process of claim 1 wherein the metallocene catalyst compound is selected from the group consisting of: bis(1,3-methyl-n-butylcyclopentadienyl) zirconium difluoride; bis (n-propylcyclopentadienyl) zirconium difluoride; (tetramethyl cyclopentadienyl) (n-propyl cyclopentadienyl) zirconium difluoride; and (pentamethyl cyclopentadienyl) (n-propyl cyclopentadienyl) zirconium difluoride.

7. The process of claim 1 wherein the methylaluminoxame is present in an amount in the range of from 4 to 7.7 mmole methylaluminoxane per gram of support material.

8. The process of claim 7 wherein the methylaluminoxane is present in an amount in the range of from 5 to 6.5 mmole methylaluminoxane per gram of support material.

9. The process of claim 8 wherein the methylaluminoxane is present in an amount in the range of from 6 to 6.5 mmole methylaluminoxane per gram of support material.

10. The process of claim 9 wherein the metallocene catalyst compound is present in an amount in the range of from 0.06 to 0.07 mmole metallocene per gram of support material.

11. The process of claim 1 wherein an antistatic agent is absent or substantially absent from the catalyst composition.

12. The process of claim 11 wherein the support material has a surface area in the range of from 150 to 450 $m^2$/gram.

13. The process of claim 11 wherein the support material has a pore volume in the range of from 1 to 2.5 $cm^3$/gram.

14. The process of claim 1 wherein the support material has a surface area in the range of from 150 to 450 $m^2$/gram.

15. The process of claim 14 wherein the support material has a surface area in the range of from 250 to 400 $m^2$/gram.

16. The process of claim 15 wherein the support material has a surface area in the range of from 300 to 350 $m^2$/gram.

17. The process of claim 1 wherein the polymer produced has a bulk density of at least 0.4 grams per cubic centimeter.

18. The process of claim 17 wherein the polymer produced has a bulk density of at least 0.48 grams per cubic centimeter.

19. The process of claim 1 wherein the support material has a pore volume in the range of from 1 to 2.5 $cm^3$/gram.

20. The process of claim 19 wherein the support material has a pore volume in the range of from 1.25 to 2.0 $cm^3$/gram.

21. The process of claim 20 wherein the support material has a pore volume in the range of from 1.5 to 1.75 $cm^3$/gram.

22. The process of claim 21 wherein the support material has an average particle size of from 20 to 30 μm.

* * * * *